US011434556B2

(12) United States Patent
Schall et al.

(10) Patent No.: US 11,434,556 B2
(45) Date of Patent: Sep. 6, 2022

(54) AUSTENITIC ALLOYS FOR TURBOCHARGERS

(71) Applicant: BorgWarner Inc., Auburn Hills, MI (US)

(72) Inventors: Gerald Schall, Bobenheim-Roxheim (DE); Ingo Dietrich, Grünstadt (DE); Andreas Kiefer, Kirchheimbolanden (DE); Russell Fish, Derby (GB)

(73) Assignee: BorgWarner Inc., Auburn Hills, MI (US)

( * ) Notice: Subject to any disclaimer, the term of this patent is extended or adjusted under 35 U.S.C. 154(b) by 53 days.

(21) Appl. No.: 16/600,772

(22) Filed: Oct. 14, 2019

(65) Prior Publication Data

US 2020/0115784 A1    Apr. 16, 2020

(30) Foreign Application Priority Data

Oct. 12, 2018   (EP) .................................... 18200214

(51) Int. Cl.
| | | |
|---|---|---|
| *C22C 38/58* | (2006.01) | |
| *C22C 38/44* | (2006.01) | |
| *F02M 26/04* | (2016.01) | |
| *C21D 9/00* | (2006.01) | |
| *C22C 38/00* | (2006.01) | |
| *C22C 38/02* | (2006.01) | |
| *C22C 38/32* | (2006.01) | |
| *C22C 38/46* | (2006.01) | |

(52) U.S. Cl.
CPC ............ *C22C 38/44* (2013.01); *C21D 9/0062* (2013.01); *C22C 38/001* (2013.01); *C22C 38/02* (2013.01); *C22C 38/32* (2013.01); *C22C 38/46* (2013.01); *C22C 38/58* (2013.01); *F02M 26/04* (2016.02); *C21D 2211/001* (2013.01); *F05D 2220/40* (2013.01)

(58) Field of Classification Search
CPC .................................................. C22C 38/58
See application file for complete search history.

(56) References Cited

U.S. PATENT DOCUMENTS

| | | |
|---|---|---|
| 2,602,738 A | 7/1952 | Jennings |
| 3,561,953 A | 2/1971 | Niimi et al. |
| 4,191,094 A | 3/1980 | Flippo |
| 4,532,974 A | 8/1985 | Mills et al. |
| 4,608,094 A | 8/1986 | Miller et al. |
| 2005/0006006 A1 | 1/2005 | Schall |
| 2005/0194073 A1 | 9/2005 | Hamano et al. |
| 2008/0163957 A1 | 7/2008 | Brady et al. |
| 2011/0176914 A1 | 7/2011 | Schall et al. |
| 2011/0182749 A1 | 7/2011 | Schall et al. |
| 2014/0261918 A1* | 9/2014 | Jin .......................... C22C 38/02 148/620 |

FOREIGN PATENT DOCUMENTS

| | | |
|---|---|---|
| CN | 101660097 A | 3/2010 |
| CN | 102149838 A | 8/2011 |
| CN | 102337481 A | 2/2012 |
| EP | 2765214 A2 | 8/2014 |
| EP | 2980254 A1 | 2/2016 |
| GB | 1116279 A | 6/1968 |
| JP | S6077964 A | 5/1985 |
| JP | 2005539138 A | 12/2005 |
| WO | 2012158332 A2 | 11/2012 |
| WO | 2018097604 A1 | 5/2018 |

OTHER PUBLICATIONS

English language abstract and machine-assisted English translation for CN 101660097 A extracted from espacenet.com database on Mar. 22, 2021, 19 pages.
English language abstract for CN 102149838 A extracted from espacenet.com database on Mar. 22, 2021, 1 page.
English language abstract and machine-assisted English translation for CN 102337481 A extracted from espacenet.com database on Mar. 22, 2021, 14 pages.
English language abstract and machine-assisted English translation for JPS 60-77964 A extracted from espacenet.com database on Mar. 22, 2021, 6 pages.
English language abstract for JP 2005-539138 A extracted from espacenet.com database on Jan. 3, 2014, 2 pages.
English language abstract and machine-assisted English translation for WO 2018/097604 A1 extracted from espacenet.com database on Mar. 22, 2021, 15 pages.
English language abstract and original Chinese language document of Shanghai Science and Technology Press, "High Temperature Alloy (Metallurgy and Productions)", Edition Group (provided by Peterreins Schley Patent-und Rechtsanwälte PartG mbB on Apr. 8, 2021), Jun. 30, 1980, 156 pages.
English language abstract and original Chinese language document of Zhang, Shijie et all, "Studies on High Temperature Oxidation Resistance of a New Type Austenitic Heat-Resistant Alloy", (provided by Peterreins Schley Patent- und Rechtsanwälte PartG mbB on Apr. 8, 2021), Dec. 10, 2013, 5 pages.

\* cited by examiner

*Primary Examiner* — Jophy S. Koshy
(74) *Attorney, Agent, or Firm* — Howard & Howard Attorneys PLLC (57) ABSTRACT

The present disclosure relates to a novel iron-based austenitic alloy for a turbocharger housing and to methods of its preparation.

9 Claims, 5 Drawing Sheets

| Temperature (°C) | Tensile Strength (MPa) | Yield Strength (MPa) | Elongation (%) | Young's Modulus (GPa) |
|---|---|---|---|---|
| 20 | 663,64 | 428,00 | 9,36 | 188,66 |
| 100 | 602,39 | 326,47 | 10,39 | 188,37 |
| 200 | 548,61 | 274,58 | 11,09 | 182,82 |
| 300 | 525,12 | 243,11 | 11,41 | 173,19 |
| 400 | 550,07 | 229,55 | 14,41 | 161,05 |
| 500 | 531,82 | 215,22 | 14,68 | 147,48 |
| 600 | 493,62 | 202,63 | 12,87 | 133,15 |
| 700 | 388,26 | 287,78 | 14,02 | 118,21 |
| 800 | 348,21 | 165,00 | 14,45 | 102,40 |
| 900 | 149,84 | 126,00 | 19,18 | 84,96 |
| 1000 | 88,20 | 65,00 | 25,76 | 64,69 |

AUSTENITIC ALLOYS FOR TURBOCHARGERS

FIELD OF THE INVENTION

The invention relates to a turbocharger housing for an internal combustion engine which comprises an iron-based austenitic alloy. The invention further relates to a process for preparing such a turbocharger housing.

TECHNICAL BACKGROUND

Exhaust-gas turbochargers are systems intended to increase the power of piston engines. In an exhaust-gas turbocharger, the energy of the exhaust gases is used to increase the power. The increase in power is a result of the increase in the throughput of mixture per working stroke. A turbocharger consists essentially of an exhaust-gas turbine with a shaft and a compressor, wherein the compressor arranged in the intake tract of the engine is connected to the shaft and the blade wheels located in the casing of the exhaust-gas turbine and the compressor rotate. In the case of a turbocharger having a variable turbine geometry, adjusting blades are additionally mounted rotatably in a blade bearing ring and are moved by means of an adjusting ring arranged in the turbine casing of the turbocharger.

The materials used for turbocharger components have to meet extremely high demands. Moreover, these demands vary from component to component, i.e. the requirements for blade wheels differ quite substantially to those for a turbine housing. For this reason, in modern day turbochargers, the materials used for different parts of a turbocharger are made from different materials which are each optimized to the task.

For instance, a turbocharger housing is exposed to high exhaust gas temperatures and, thus, the materials of its components have to be heat- and corrosion-resistant. At the same time, the dimensional stability of the turbocharger housing at ambient to operating temperatures of up to about 1050° C. has to be excellent. Moreover, the housing is exposed to rapid temperature changes while being exposed to mechanical loads and, thus, has to be sufficiently resistant to thermal-mechanical fatiguing. Finally, the housing makes up a very substantial mass-portion of the turbocharger and, thus, the cost of the material is an important consideration as well.

In the prior art, materials which were used for very-high-temperature turbocharger housings included austenitic iron-based alloys having a relatively high nickel content. High nickel contents of more than 20% by weight are common in austenitic iron-based alloys commonly used for this type of application (e.g. steel 1.4848 in accordance with DIN EN 10295, available from Eisenwerk Hasenclever & Sohn GmbH, Germany). Nickel stabilizes the austenitic structure and makes it possible for such an alloy to have a high thermal stability. The disadvantage is that the material costs of nickel are very high and, furthermore, are subject to high fluctuations, which makes long-term cost planning difficult.

To address these issues, the prior art suggested austenitic turbine housing alloys having a relatively low nickel content. WO 2012/158332 A2 discloses an iron-based turbocharger housing comprising an alloy having a less than 10% by weight, in particular less than 1% by weight of nickel. Turbine housings made from such materials have relatively low material costs with a small fluctuation in price due to the absence or relatively low amount of nickel. In its example, WO 2012/158332 A2 suggests a turbocharger housing consisting of the following elements: C: 0.25 to 0.35% by weight, Cr: 15 to 16.5% by weight, Mn: 15 to 17% by weight, Si: 0.5 to 1.2% by weight, Nb: 0.5 to 1.2% by weight, W: 2 to 3% by weight, N: 0.2 to 0.4% by weight, remainder: Fe. The alloys of WO 2012/158332 A2 may represent an adequate replacement of standard nickel-containing housing alloys such as the steel 1.4848 (in accordance with DIN EN 10295).

SUMMARY OF THE DISCLOSURE

In one aspect, the present disclosure relates to a turbocharger housing for an internal combustion engine comprising an iron-based austenitic alloy consisting of the following composition:
C: about 0.2 to about 0.6 wt.-%,
Cr: about 17 to about 25 wt.-%,
Mn: about 8 to about 13 wt.-%,
Ni: about 2 to about 6 wt.-%,
Si: about 0.5 to about 3 wt.-%,
Nb: about 0.2 to about 1 wt.-%,
V: about 0.2 to about 1 wt.-%,
Mo: about 0.2 to about 1.5 wt.-%
N: about 0.01 to about 0.6 wt.-%;
optionally one or more of the following elements in the following amounts:
W: about 0.01 to about 3 wt.-%,
B: about 0.01 to about 0.1 wt.-%,
Cu: about 0.01 to about 0.5 wt.-%;
Ce: about 0.01 to about 0.3 wt.-%
optionally other elements in a total amount of less than about 3 wt.-% (impurities); and
Fe as balance
wherein the turbocharger housing is cast from the iron-based austenitic alloy.

In another aspect, the present disclosure relates to a process for preparing a turbocharger housing as defined in any one of the preceding claims, comprising: a) melt mixing elements of the following composition:
C: about 0.2 to about 0.6 wt.-%,
Cr: about 17 to about 25 wt.-%,
Mn: about 8 to about 13 wt.-%,
Ni: about 2 to about 6 wt.-%,
Si: about 0.5 to about 3 wt.-%,
Nb: about 0.2 to about 1 wt.-%,
V: about 0.2 to about 1 wt.-%,
Mo: about 0.2 to about 1.5 wt.-%,
N: about 0.01 to about 0.6 wt.-%;
optionally one or more of the following elements in the following amounts:
W: about 0.01 to about 3 wt.-%,
B: about 0.01 to about 0.1 wt.-%,
Cu: about 0.01 to about 0.5 wt.-%;
Ce: about 0.01 to about 0.3 wt.-%
optionally other elements in a total amount of less than about 3 wt.-% (impurities); and
Fe as balance;
and b) casting the melt into a turbocharger housing.

A turbocharger housing prepared from the above-specified alloys may be endowed with exceptionally good thermomechanical fatigue (TMF) performance and exceptionally good oxidation resistance.

Moreover, turbocharger housings prepared from these alloys may have a particularly smooth surface in the as-cast state. Providing a smooth surface on the inner surface of the turbine housing reduces (exhaust) gas friction and, thus, increases efficiency of the turbocharger. They may also require less processing after being cast.

DETAILED DESCRIPTION OF THE DISCLOSURE

In its broadest aspect, the present disclosure relates to a turbocharger housing for an internal combustion engine comprising an iron-based austenitic alloy which comprises the following elements in the following amounts:

C: about 0.2 to about 0.6 wt.-%, in particular about 0.3 to about 0.5 wt.-%,
Cr: about 17 to about 25 wt.-%, in particular about 19 to about 23 wt.-%,
Mn: about 8 to about 13 wt.-%, in particular about 9 to about 12 wt.-%,
Ni: about 2 to about 6 wt.-%, in particular about 3 to about 5 wt.-%,
Si: about 0.5 to about 3 wt.-%, in particular about 1.0 to about 2.2 wt.-%,
Nb: about 0.2 to about 1 wt.-%, in particular about 0.3 to about 0.7 wt.-%,
V: about 0.2 to about 1 wt.-%, in particular about 0.2 to about 0.8 wt.-%, and
Mo: about 0.2 to about 1.5 wt.-%, in particular about 0.2 to about 0.8 wt.-%;

Optionally, the iron-based austenitic alloy may comprise one or more of the following elements in the following amounts:

N: about 0.01 to about 0.6 wt.-%, in particular about 0.1 to about 0.5 wt.-%.
W: about 0.01 to about 3 wt.-%, in particular about 0.5 to about 2 wt.-%,
B: about 0.01 to about 0.1 wt.-%, in particular about 0.01 to about 0.05 wt.-%,
Cu: about 0.01 to about 0.5 wt.-%, in particular about 0.1 to about 0.3 wt.-%; and
Ce: about 0.01 to about 0.3 wt.-%, in particular about 0.1 to about 0.2 wt.-%.

Optionally, the iron-based austenitic alloy may comprise other elements in a total amount of less than about 3 wt.-% (impurities), in particular less than about 2 wt.-%, more specifically less than about 1 wt.-%. When referring to other elements in a total amount of less than about 3 (or less) wt.-% (impurities), it is to be understood that Fe forms the balance of the alloy.

The turbocharger housing may be cast from the iron-based austenitic alloy.

The austenitic iron-based alloy according to the present disclosure is characterized by the fact that, in addition to Fe, it contains the elements C, Cr, Mn, Ni, Si, Nb, V, Mo, and N. The elements added to the iron-based alloy may be present therein, or in a turbocharger housing which is formed from said iron-based alloy, in their original form, i.e. in elemental form, for example in the form of inclusions or precipitation phases, or else in the form of derivatives thereof, i.e. in the form of a compound of the corresponding element, e.g. as a metal carbide or metal nitride, which forms either during the production of the iron-based alloy or else when forming the turbocharger housing which is produced therefrom. The presence of the respective element can be detected in both the iron-based alloy and a turbocharger housing, by conventional analytical methods such as atomic absorption spectroscopy (AAO).

Without being bound by theory, the above elements provide the following contributions to the alloys of the disclosure. The below description is not intended to be comprehensive and/or limiting in any way:

Carbon (C) may be a strong austenite former that also significantly increases mechanical strength. It may also improve the flow properties of the alloy melt. If it is present in an amount of less than about 0.2% by weight, the alloy melt may have low flowability. This may make it difficult to produce the iron-based alloy according to the disclosure. If the carbon content is higher than about 0.6% by weight, coarse-grained graphite particles may form, which may have a negative effect on the elongation properties. It may be particularly beneficial to use C in amounts between about 0.25 and about 0.5% by weight, and specifically between about 0.3 and about 0.45% by weight.

Chromium (Cr) may be a strong carbide former and may increase the temperature resistance of the material, in particular the high-temperature strength and high-temperature dimensional stability. Cr furthermore may have the ability to form a Cr-containing oxide surface layer which may promote the resistance of the alloy to oxidation. The oxidation resistance may be sufficient if about 17% by weight is used. In high concentrations of more than about 23% by weight, the element chromium may act as a ferrite stabilizer which may have disadvantageous effects on the stability of the austenitic iron-based alloy or hinders the formation of the austenitic structure. It may be particularly beneficial to use Cr in amounts between about 19 and about 22.5% by weight, and specifically between about 20 and about 22% by weight.

Manganese (Mn) may increase hardenability and tensile strength of the alloys of the disclosure, but to a lesser extent than carbon. Manganese may also increase the rate of carbon penetration during carburizing and may act acts as a mild deoxidizing agent. However, when too high carbon and too high manganese are used, embrittlement may set in. Therefore, it may be beneficial to the set the range of Mn to between about 8% by weight and about 13% by weight, in particular between about 8.5 and about 12% by weight, and specifically between about 9.5 and about 11.5% by weight.

Nickel (Ni) may be a strong austenite stabilizer. Moreover, Ni may increase the alloy's ductility, toughness, and corrosion resistance. However, Ni is expensive and subject to unpredictable price alterations. Therefore, it may be beneficial to set the range of Ni to between about 2% by weight and about 6% by weight, in particular between about 2.5 and about 5.0% by weight, and specifically between about 3.0 and about 4.0% by weight.

Silicon (Si) may improve the flowability of the alloy melt and, furthermore, may form a passivating oxide layer on the surface of the material which may increase its oxidation resistance. However, if used in larger amounts, Si may promote the formation of destabilizing sigma phases. Sigma phases are brittle, intermetallic phases of high hardness. They arise when a body-centered cubic metal and a face-centered cubic metal, whose atomic radii match with only a slight discrepancy, encounter one other. Sigma phases of this type are undesirable since they have an embrittling effect and may deplete the iron matrix of Cr. Therefore, it may be beneficial to set the range of Si to between about 0.5% by weight and about 3% by weight, in particular between about 1.4 and about 2.3% by weight, and specifically between about 1.6 and about 2.2% by weight.

Niobium (Nb) may be carbide former, which may contribute to the stabilization of the austenitic structure of the alloys according to the present disclosure. However, like silicon, higher amounts of Nb may promote the formation of sigma phases in an austenitic iron-based alloy. Therefore, it may be beneficial to set the range of Nb to between about 0.2% by weight and about 1% by weight, in particular between about 0.3 and about 0.8% by weight, and specifically between about 0.4 and about 0.6% by weight.

Vanadium (V) may provide surface smoothness. Moreover, V may be used to refine grain size. V may decrease the rate of grain growth during heat treating processes and may raise the temperature at which grain coarsening sets in, thus, may improve the strength and toughness of the alloy. However, larger amounts of V may reduce the hardenability of the alloy due to excessive formation of carbides. Therefore, it may be beneficial to set the range of V to between about 0.2% by weight and about 1% by weight, in particular between about 0.25 and about 0.8% by weight, and specifically between about 0.3 and about 0.6% by weight.

Molybdenum (Mo) may improve the creep resistance of the alloy material at high temperatures. However, higher amounts of Mo may promote the formation of sigma phases in an austenitic iron-based alloy. Therefore, it may be beneficial to set the range of Mo to between about 0.2% by weight and about 1.5% by weight, in particular between about 0.25 and about 1.0% by weight, and specifically between about 0.3 and about 0.6% by weight.

Advantageously, the iron-based austenitic alloy may contain about 0.3 to about 0.5 wt.-% C, about 19 to about 23 wt.-% Cr, about 9 to about 12 wt.-% Mn, about 3 to about 5 wt.-% Ni, about 1.0 to about 2.2 wt.-% Si, about 0.3 to about 0.7 wt.-% Nb, about 0.2 to about 0.8 wt.-% V, about 0.2 to about 0.8 wt.-% Mo, and about 0.01 to about 0.6 wt.-% N, if used, in particular about 0.1 to about 0.5 wt.-% N.

As stated above, the alloys according to the present disclosure may optionally comprise other elements as well, in particular one or more of W, B, N, Cu, or Ce.

In particular, it may be advantageous to include B into the alloy in amounts of about 0.01 to about 0.1 wt.-%, more specifically about 0.01 wt.-% to about 0.05 wt.-%, and in particular about 0.01 to about 0.02 wt.-%. Such amounts may be beneficial to reduce the torque required to drill holes into the turbocharger housing.

Although it may be optionally used, it may be advantageous that the iron-based austenitic alloy contains less than 0.5 wt.-%, more specifically less than 0.2 wt.-%, and in particular less than about 0.05 wt.-% W.

Nitrogen (N) may also be optionally used. N may promote the stabilizing effect which Mn has on the austenitic iron-based alloy. The combination of manganese and nitrogen is therefore particularly preferable. Nitrogen—like nickel—is a strong gammagenic element which may have an advantageous influence on the temperature resistance, in particular high temperature oxidation and corrosion resistance. However, in larger amounts, N may embrittle the alloy and may be difficult to cast due to outgassing. Therefore, it may be beneficial to set the range of N to between about 0.01% by weight and about 0.6% by weight.

Advantageously, the iron-based austenitic alloy may contain less than about 0.1 wt.-% S, more specifically less than about 0.06 wt.-% S, and in particular less than about 0.04 wt.-% S.

Advantageously, the iron-based austenitic alloy may contain less than about 0.1 wt.-% P, more specifically less than about 0.07 wt.-% P, and in particular less than about 0.07 wt.-% P.

Advantageously, the iron-based austenitic alloy may have less than about 4%, more specifically less than about 3%, and in particular less than about 2%, sigma phases. Such sigma phases can be readily identified by the skilled person, for instance by morphologically analyzing a sample of the alloy. In this case, the reference to % refers to the area-% of sigma phases occupying a given surface area of a morphological sample.

Advantageously, the iron-based austenitic alloy may have a microstructure with an average grain size number of between about 2 and about 4, measured according to ASTM E112-12. Alternatively, the average grain size number may be between about 2 and about 4, measured according to ISO 643.

Advantageously, the iron-based austenitic alloy may have one or more, in particular all, of the following mechanical properties:
Rm: >620 MPa
$R_{p0.2}$: >350 MPa
Elongation: >5%
Hardness: 240 to 300 HB
Coefficient of thermal expansion: 16.5-19.5-1/K (20-900° C.)
Heat resistance at 700° C.: Rm>385 Mpa and $R_{p0.2}$>245 MPa
Heat resistance at 800° C.: Rm>240 Mpa and $R_{p0.2}$>175 MPa
Heat resistance at 900° C.: Rm>150 Mpa and $R_{p0.2}$>125 MPa
Heat resistance at 1000° C.: Rm>70 Mpa and $R_{p0.2}$>50 MPa Advantageously, the iron-based austenitic alloy may consist of the following composition:
C: about 0.3 to about 0.5 wt.-%,
Cr: about 19 to about 23 wt.-%,
Mn: about 9 to about 12 wt.-%,
Ni: about 3 to about 5 wt.-%,
Si: about 1.0 to about 2.2 wt.-%,
Nb: about 0.3 to about 0.7 wt.-%,
V: about 0.2 to about 0.8 wt.-%,
Mo: about 0.2 to about 0.8 wt.-%;
optionally one or more of the following elements in the following amounts:
N: about 0.1 to about 0.5 wt.-%,
W: about 0.5 to about 2 wt.-%,
B: about 0.01 to about 0.05 wt.-%,
Cu: about 0.1 to about 0.3 wt.-%,
Ce: about 0.1 to about 0.2 wt.-%;
optionally other elements in a total amount of less than about 3 wt.-% (impurities); and
Fe as balance.

Advantageously, the iron-based austenitic alloy may consist of the following composition:
C: about 0.3 to about 0.5 wt.-%,
Cr: about 19 to about 23 wt.-%,
Mn: about 9 to about 12 wt.-%,
Ni: about 3 to about 5 wt.-%,
Si: about 1.0 to about 2.2 wt.-%,
Nb: about 0.3 to about 0.7 wt.-%,
V: about 0.2 to about 0.8 wt.-%, Mo: about 0.2 to about 0.8 wt.-%,
N: about 0.1 to about 0.5 wt.-%;
optionally one or more of the following elements in the following amounts:
W: about 0.5 to about 2 wt.-%,
B: about 0.01 to about 0.05 wt.-%,
Cu: about 0.1 to about 0.3 wt.-%,
Ce: about 0.1 to about 0.2 wt.-%;
optionally other elements in a total amount of less than about 3 wt.-% (impurities); and
Fe as balance.

Advantageously, the iron-based austenitic alloy may have a melting temperature of less than about 1550° C., more specifically in the range of about 1450 to about 1530° C., in particular in the range of about 1450° C. to about 1525° C. The present inventors have surprisingly found that the melting temperature of the alloys of the present disclosure may be substantially reduced in comparison to the melting temperature of both conventional nickel-containing austenitic steels and the alloys disclosed in WO 2012/158332 A2. These austenitic steels have melting temperatures of about 1600° C. to about 1650° C. Therefore, alloys according to this embodiment of the disclosure may be cast at a lower temperature and may be subject to less oxidation during the casting process. This may further facilitate obtaining a smooth surface of the turbocharger housing when the housing is cast from such an alloy.

Advantageously, the turbocharger housing may have relatively smooth inner surface, in particular an inner surface of the turbocharger housing may have a surface roughness Rz of less than about 100, more specifically less than about 80, and in particular less than about 60. The surface roughness Rz may be determined according to DIN 4768:1990-05.

In another aspect of the present disclosure, there is provided a process for preparing a turbocharger housing using an alloy as defined in any one of the preceding embodiments. More specifically with respect to the process, there is provided a process for preparing a turbocharger housing, comprising
a) melt mixing elements of the following composition:
C: about 0.2 to about 0.6 wt.-%,
Cr: about 17 to about 25 wt.-%,
Mn: about 8 to about 13 wt.-%,
Ni: about 2 to about 6 wt.-%,
Si: about 0.5 to about 3 wt.-%,
Nb: about 0.2 to about 1 wt.-%,
V: about 0.2 to about 1 wt.-%,
Mo: about 0.2 to about 1.5 wt.-%;
optionally one or more of the following elements in the following amounts:
N: about 0.01 to about 0.6 wt.-%, in particular about 0.1 to about 0.5 wt.-%,
W: about 0.01 to about 3 wt.-%,
B: about 0.01 to about 0.1 wt.-%,
Cu: about 0.01 to about 0.5 wt.-%,
Ce: about 0.01 to about 0.3 wt.-%;
optionally other elements in a total amount of less than about 3 wt.-% (impurities); and
Fe as balance;
b) casting the melt into a turbocharger housing.

Advantageously, the process according to the present disclosure may comprise subjecting the turbocharger housing to a heat treatment. Suitable examples of such a heat treatment include thermal aging at about 1000° C. to about 1060° C., in particular about 1010° C. to about 1050° C., for about 2 to about 6 hours, followed by cooling at a rate of up to about 80° C./h, in particular about 60 to about 80° C./h.

The cooling may be continued until reaching a temperature of about 500° C. to about 700° C., in particular about 550° C. to about 650° C. The alloy may than be allowed to reach ambient temperatures by e.g. air cooling.

Suitable exemplary processes for producing alloy materials and articles produced therefrom are indicated in the following documents, all of which are incorporated by reference in their entirety: U.S. Pat. Nos. 4,608,094 A, 4,532,974 A and 4,191,094 A.

Advantageously, the casting in the process according to the present disclosure may be an investment casting or a sand casting process.

Advantageously, the process according to the present disclosure may be a process wherein an inner surface of the turbocharger housing that is in contact with exhaust gas or compressed air is not subjected to an ablating procedure for at least partially removing an oxide layer on said inner surface.

Figure 1:
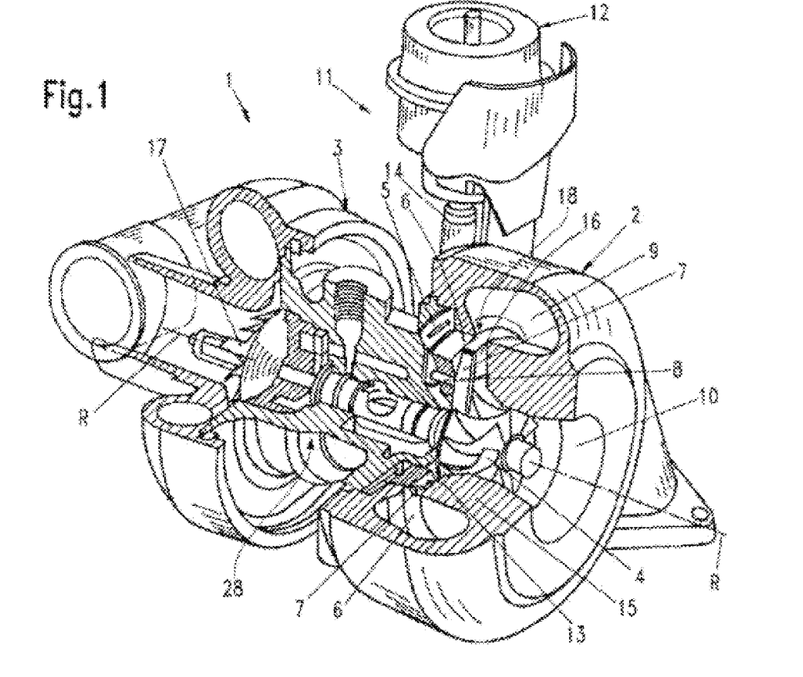
FIG. 1 shows a turbocharger for an internal combustion engine.

FIG. 1 shows a perspective view, shown partially in section, of an exhaust-gas turbocharger according to the invention. The components referred to in FIG. 1 are as follows:
1 Turbo charger
2 Turbine casing
3 Compressor casing
4 Turbine rotor
5 Adjusting ring
6 Blade bearing ring
7 Adjusting blades
8 Pivot axles
9 Supply duct
10 Axial connection piece
11 Actuating device
12 Control casing
13 Free space for guide blades 7
14 Tappet member
15 Annular part of the turbine casing 2
16 Spacer/spacer cam
17 Compressor rotor
18 Guide grate
28 Bearing casing
R Axis of rotation FIG. 1 shows a turbocharger 1, which has a turbine casing 2 and a compressor casing 3 which is connected to the latter via a bearing casing 28. The casings 2, 3 and 28 are arranged along an axis of rotation R. The turbine casing is shown partially in section in order to illustrate the arrangement of a blade bearing ring 6 and a radially outer guide grate 18, which is formed by said ring and has a plurality of adjusting blades 7 which are distributed over the circumference and have rotary axles 8. In this way, nozzle cross sections are formed which, depending on the position of the adjusting blades 7, are larger or smaller and act to a greater or lesser extent upon the turbine rotor 4, positioned in the center on the axis of rotation R, with the exhaust gas from an engine, said exhaust gas being supplied via a supply duct 9 and discharged via a central connection piece 10, in order to drive a compressor rotor 17 seated on the same shaft using the turbine rotor 4. In order to control the movement or the position of the adjusting blades 7, an actuating device 11 is provided. This may be designed in any desired way and one option may have a control casing 12 which controls the control movement of a tappet member 14 fastened to it, in order to convert the movement of said tappet member on an adjusting ring 5, located behind the blade bearing ring 6, into a slight rotational movement of said adjusting ring. A free space 13 for the adjusting blades 7 is formed between the blade bearing ring 6 and an annular part 15 of the turbine casing 2. So that this free space 13 can be ensured, the blade bearing ring 6 has spacers 16. In FIG. 1, both the turbine casing 2 and a compressor casing 3 may represent, independently or jointly, a turbine housing according to the present disclosure.

Given the performance characteristics of the alloy of the present disclosure, in particular the excellent resistance to oxidation and thermal shocks as well as the smoothness of casts made from the alloy, it is also contemplated to use the alloy of the present invention in manifolds, in particular in manifolds for an internal combustion engine. Thus, where heretofore reference was made to a turbocharger housing, it should be understood that the same passages equally apply to manifolds, in particular in manifolds for an internal combustion engine.

Example 1

A turbocharger housing was prepared by a conventional sand-casting process using a casting temperature of about 1498° C. The iron-based austenitic alloy used in the cast process contained, besides impurities, the following elements:
C: 0.3 to 0.45 wt.-%,
Cr: 20 to 22 wt.-%,
Mn: 9.5 to 11.5 wt.-%,
Ni: 3 to 4 wt.-%,
Si: 1.2 to 2 wt.-%,
Nb: 0.4 to 0.6 wt.-%,
V: 0.3 to 0.6 wt.-%,
Mo: 0.3 to 0.6 wt.-%,
N: 0.15 to 0.35 wt.-%;
Fe as balance.

Figure 2:
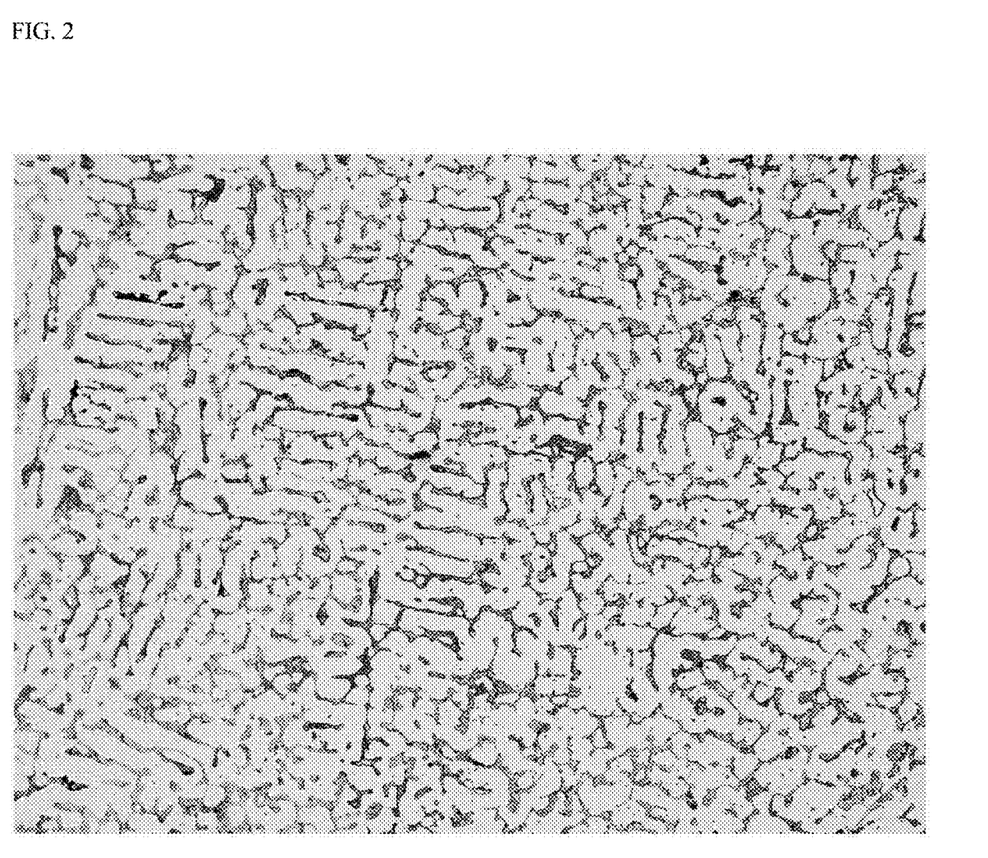
FIG. 2 shows the V2a-etched austenitic morphology of the alloy according to Example 1.

FIG. 2 shows the V2a-etched austenitic morphology of the alloy according to Example 1.

Comparative Example 1

A turbocharger housing was prepared by a conventional sand-casting process using a casting temperature of about 1550° C. The iron-based austenitic alloy used in the cast process corresponds to the alloy disclosed in the example of WO 2012/158332 A2. It contained, besides impurities, the following elements:
C: 0.25 to 0.35% by weight,
Cr: 15 to 16.5% by weight,
Mn: 15 to 17% by weight,
Si: 0.5 to 1.2% by weight,
Nb: 0.5 to 1.2% by weight,
W: 2 to 3% by weight,
N: 0.2 to 0.4% by weight,
Fe as balance Housings and test samples of the alloy according to Example 1 and Comparative Example 1 were subjected to a series of comparative tests.
1. Mechanical Performance The mechanical performance (tensile strength, yield strength, and E-modulus) of both alloys was found to be acceptable and within ranges with are suitable for a turbocharger housing, in particular at operating temperatures of 950-1000° C. However, the alloy of Example 1 had a substantially improved performance with respect to the elongation at operating temperatures: The elongation of Example 1 was only about 45% in comparison to about 70 to 80% for Comparative Example 1. The excellent elongation at operating temperatures can be expected to positively contribute to TMF performance.

Figure 3A:
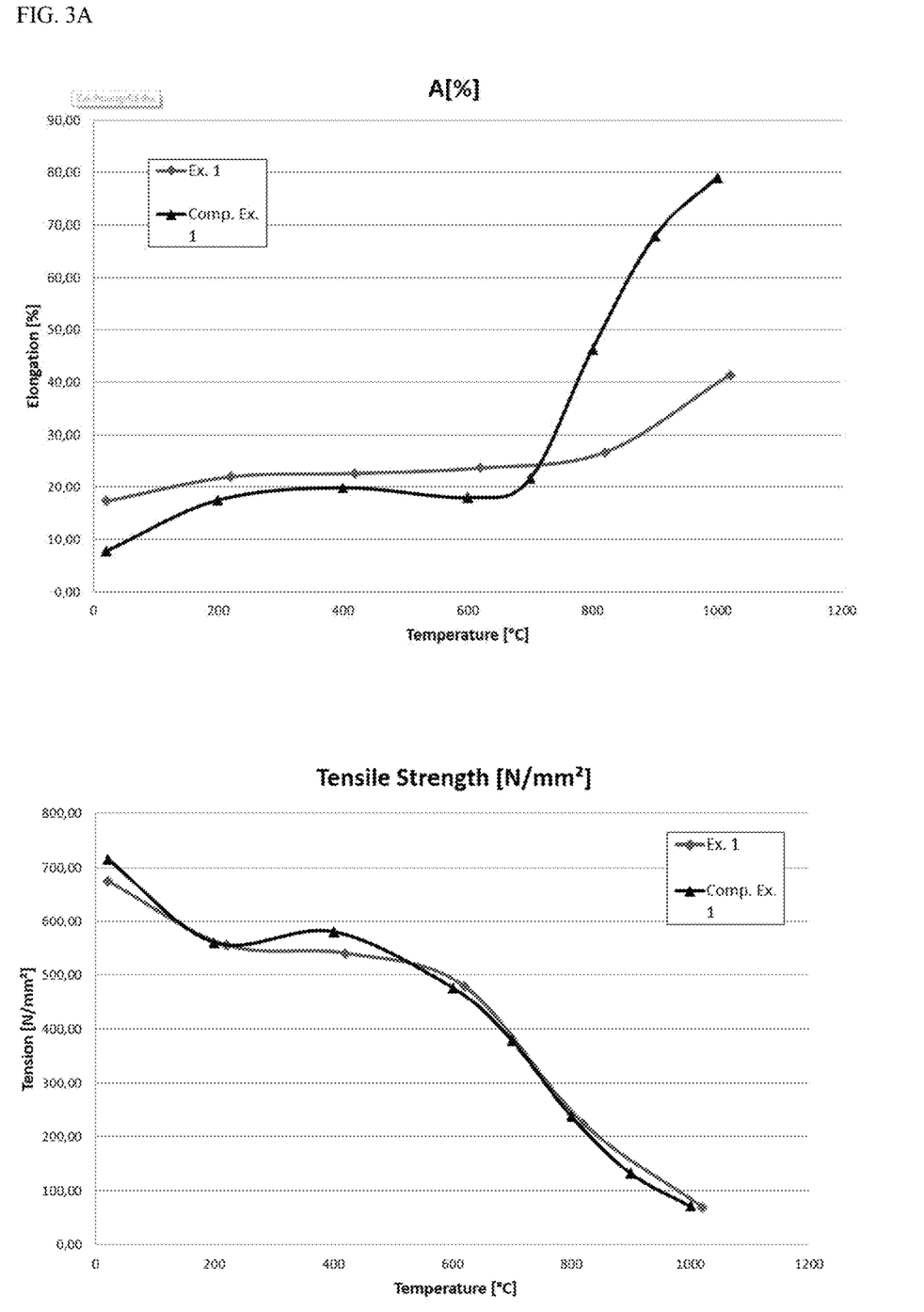
FIGS. 3A and 3B show the mechanical performance of the alloys according to Example 1 and Comparative Example 1.
Figure 3B:
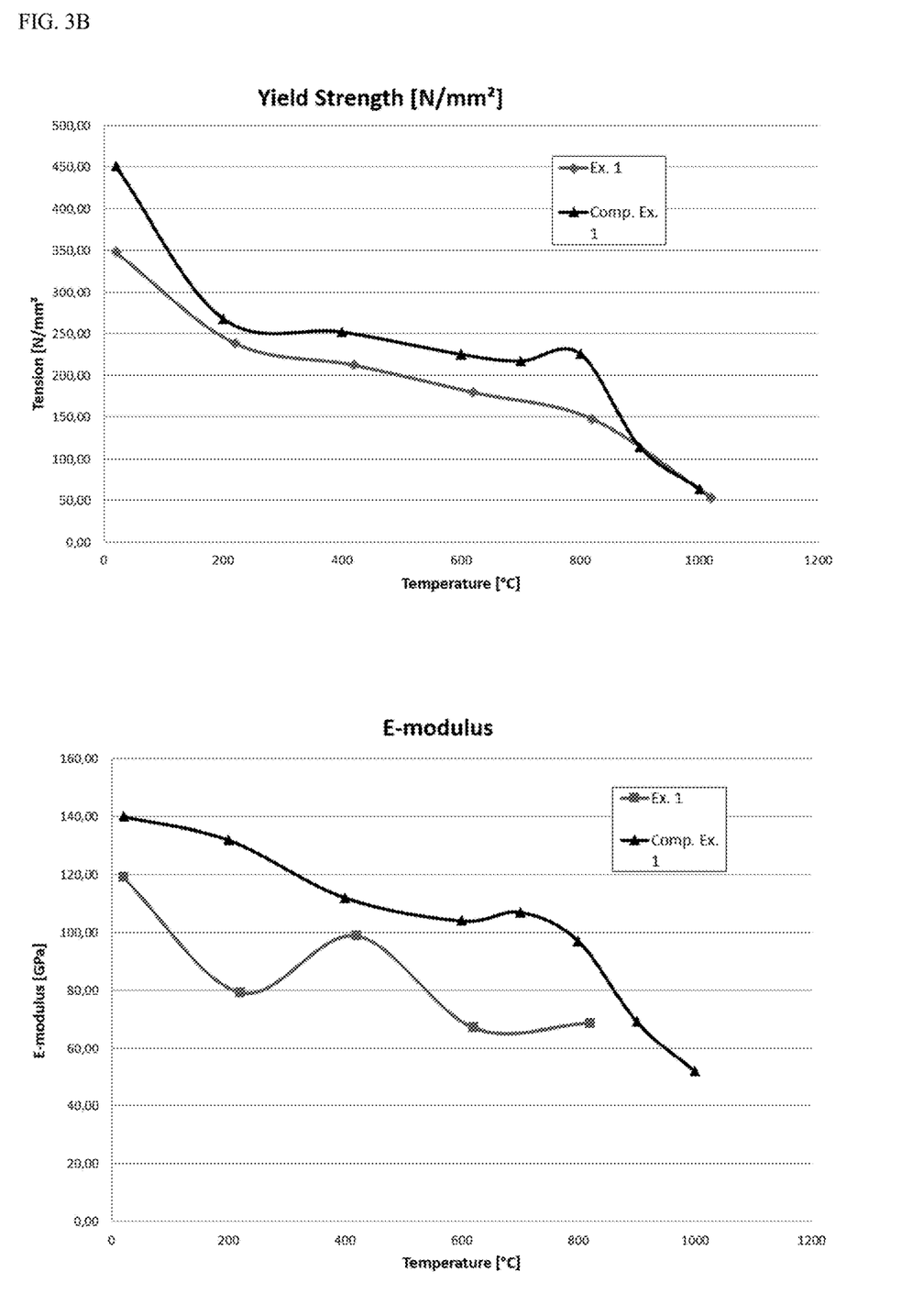

FIGS. 3A and 3B show the results of the mechanical performance.
2. Oxidation Resistance The oxidation resistance of the alloy was tested by exposing a sample of the alloy to simulated exhaust gas (85% $N_2$ and 15% $CO_2$) in a 24 h-temperature cycle of 1000° C. (about 16 h) and 1020° C. (about 8 h). Overall exposure time was 15 days/cycles (360 h). Samples were cooled to ambient temperatures while flushing the samples with argon. The degree of oxidation was determined by measuring the weight change of the samples.

It was found that the oxidative weight loss of the Example 1 was about 60% less than the weight loss of Comparative Example 1.

Further investigation of cross-sectional cuts of the test samples revealed that the oxidation depth of the Example 1 was only about 159 μm and the surface appeared relatively smooth. Comparative Example 1 showed an oxidation depth of about 341 μm and the surface appeared relatively rough.
3. Thermal Shock Testing A turbocharger housing prepared from the alloy according to Example 1 was subjected to a thermal shock test. The test conditions were as follows: temperature 980° C. (970-995° C.) and duration 300 h/1800 cycles (cycle time 300 sec.). Afterwards, the housing was inspected for oxidation, scaling and microcracks. The housing passed the test and performed on a comparable level to approved commercial turbocharger housings.
4. Surface Smoothness Turbocharger housings according to Examples 1 and 2 were compared with respect to their surface smoothness in the as-cast state. The surface smoothness of the turbocharger housings was substantially improved for the housing according to Example 1, in comparison to the housing according to Comparative Example 1.

Example 2

A turbocharger housing was prepared by a conventional sand-casting process using a casting temperature of similar to that of Example 1. The iron-based austenitic alloy used in the cast process contained, besides impurities, the following elements:
C: 0.3 to 0.45 wt.-%,
Cr: 20 to 22 wt.-%,
Mn: 9.5 to 11.5 wt.-%,
Ni: 3 to 4 wt.-%,
Si: 1.6 to 2.1 wt.-%,
Nb: 0.4 to 0.6 wt.-%,
V: 0.3 to 0.6 wt.-%,
Mo: 0.3 to 0.6 wt.-%,
N: 0.1 to 0.25 wt.-%;
Fe as balance.

Figure 4:
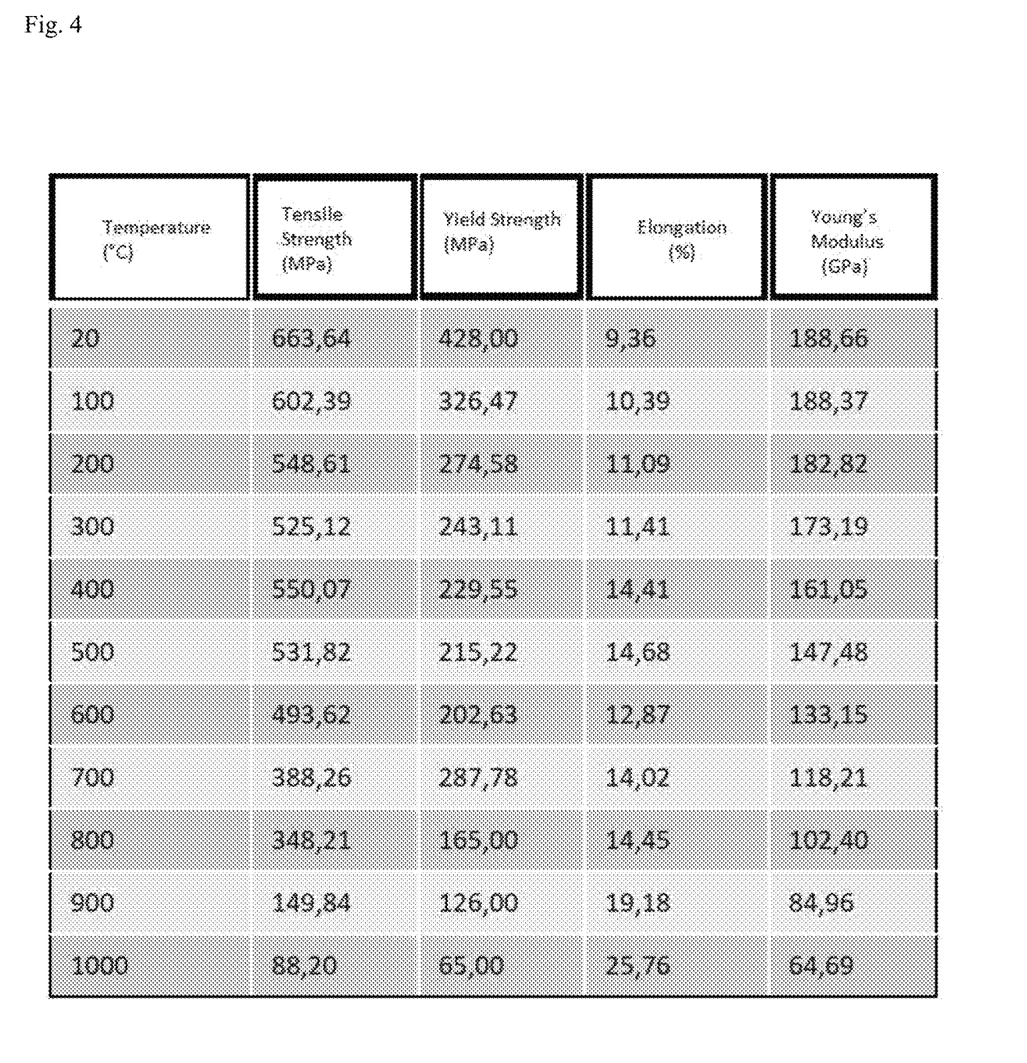
FIG. 4 shows the mechanical performance if the alloy according to Example 2.

The alloy performed similarly well, and in parts even better, than the alloy of Example 1, see properties shown in FIG. 4.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, the invention may be practiced otherwise than as specifically described.

The invention claimed is:

1. A turbocharger housing for an internal combustion engine comprising an iron-based austenitic alloy, wherein the iron-based austenitic alloy consists of the following composition:
C: 0.3 to 0.45 wt. %,
Cr: 20 to 22 wt. %,
Mn: 9.5 to 11.5 wt. %,
Ni: 3 to 4 wt. %,
Si: 1.2 to 2.1 wt. %,
Nb: 0.4 to 0.6 wt. %,
V: 0.3 to 0.6 wt. %,
Mo: 0.3 to 0.6 wt. %,
N: 0.1 to 0.35 wt. %;
impurities in a total amount of less than 3 wt. %; and
Fe as balance;
wherein the turbocharger housing is cast from the iron-based austenitic alloy and wherein the iron-based austenitic alloy has a melting temperature of less than 1550° C.

2. The turbocharger housing according to claim 1, wherein the iron-based austenitic alloy has a melting temperature in the range of 1450° C. to less than 1550° C.

3. The turbocharger housing according to claim 1, wherein the iron-based austenitic alloy has less than 4% sigma phases.

4. The turbocharger housing according to claim 1, wherein the iron-based austenitic alloy has less than 2% sigma phases.

5. The turbocharger housing according to claim 1, wherein the microstructure of the iron-based austenitic alloy has an average grain size of between 2 and 4, measured according to ASTM E112-12.

6. The turbocharger housing according to claim 1, wherein an inner surface of the turbocharger housing that is in contact with exhaust gas or compressed air has a surface roughness Rz of less than 100.

7. A process for preparing a turbocharger housing as defined in claim 1, comprising
a) melt mixing elements of the following composition, wherein the composition consists of:
C: 0.3 to 0.45 wt. %,
Cr: 20 to 22 wt. %,
Mn: 9.5 to 11.5 wt. %,
Ni: 3 to 4 wt. %,
Si: 1.2 to 2.1 wt. %,
Nb: 0.4 to 0.6 wt. %,
V: 0.3 to 0.6 wt. %,
Mo: 0.3 to 0.6 wt. %;
N: 0.1 to 0.35 wt. %;
impurities in a total amount of less than 3 wt. %; and
Fe as balance, to form an iron-based austenitic alloy melt;
b) casting the melt into a turbocharger housing.

8. The process according to claim 7, wherein the turbocharger housing is subjected to thermal aging at 1000° C. to 1060° C. for at least 1 hour, followed by cooling at a rate of up to 80° C./h.

9. The process according to claim 7, wherein casting is an investment casting or a sand casting process.

* * * * *